(12) United States Patent
Taguchi et al.

(10) Patent No.: US 9,194,982 B2
(45) Date of Patent: Nov. 24, 2015

(54) OPTICAL MEMBER, PROCESS FOR PRODUCING SAME, AND ARTICLE PROVIDED WITH OPTICAL MEMBER

(71) Applicant: ASAHI GLASS COMPANY, LIMITED, Chiyoda-ku (JP)

(72) Inventors: Daisuke Taguchi, Tokyo (JP); Masakazu Ataku, Tokyo (JP); Kazuo Hamazaki, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 14/304,062

(22) Filed: Jun. 13, 2014

(65) Prior Publication Data

US 2014/0296367 A1  Oct. 2, 2014

Related U.S. Application Data

(63) Continuation of application No. PCT/JP2013/050983, filed on Jan. 18, 2013.

(30) Foreign Application Priority Data

Jan. 30, 2012 (JP) .................................. 2012-016477

(51) Int. Cl.

| | |
|---|---|
| C08F 2/46 | (2006.01) |
| C08F 2/50 | (2006.01) |
| C08G 61/04 | (2006.01) |
| G02B 1/04 | (2006.01) |
| C08F 214/26 | (2006.01) |
| C08J 3/28 | (2006.01) |

(52) U.S. Cl.
CPC ................. G02B 1/04 (2013.01); C08F 214/26 (2013.01); C08J 3/28 (2013.01); C08J 2327/18 (2013.01)

(58) Field of Classification Search
CPC ....... G02B 1/04; C08F 210/02; C08F 214/26; C08F 214/182; C08J 3/28
USPC .................................... 522/185, 184, 1; 520/1
See application file for complete search history.

(56) References Cited

U.S. PATENT DOCUMENTS

| 6,461,719 B1 * | 10/2002 | Ichikuni et al. ............... 428/147 |
| 7,019,079 B2 * | 3/2006 | Sumi et al. .................... 525/199 |
| 2009/0301752 A1 * | 12/2009 | Aida et al. .............. 174/110 SR |
| 2011/0172336 A1 * | 7/2011 | Nakano et al. .................. 524/99 |
| 2011/0213089 A1 * | 9/2011 | Yamasaki et al. ............. 525/276 |
| 2012/0108723 A1 * | 5/2012 | Nakano et al. ................ 524/280 |
| 2012/0108774 A1 | 5/2012 | Taguchi et al. |

FOREIGN PATENT DOCUMENTS

| JP | 58-164609 | | 9/1983 |
| JP | 7-41522 | | 2/1995 |
| JP | 07-041522 | * | 2/1995 |
| JP | 7-41563 | | 2/1995 |
| JP | 07-041563 | * | 2/1995 |
| JP | 7-292199 | | 11/1995 |
| JP | 11-349711 | | 12/1999 |
| JP | 2000-278559 | | 10/2000 |
| JP | 3424270 | | 5/2003 |
| JP | 2010-37475 | | 2/2010 |
| JP | 2010-222540 | | 10/2010 |
| WO | 2011/024610 | | 3/2011 |

OTHER PUBLICATIONS

Masanori et al, JP 07-041563 Machine Translation, Feb. 10, 1995.*
Momii et al, JP 07-041522 Machine Translation, Feb. 10, 1995.*
International Search Report issued Mar. 26, 2013 in PCT/JP2013/050983 filed Jan. 18, 2013.

* cited by examiner

*Primary Examiner* — Ling Choi
*Assistant Examiner* — Jessica E Whiteley
(74) *Attorney, Agent, or Firm* — Oblon, McClelland, Maier & Neustadt, L.L.P.

(57) ABSTRACT

To provide an optical member having an excellent transparency and heat resistance and further having favorable light resistance as compared with a molded product made of a conventional ethylene/tetrafluoroethylene copolymer, a process for producing the same, and an article provided with the optical member. An optical member made of a molded product containing a crosslinked product of an ethylene/tetrafluoroethylene copolymer comprising units (A) based on tetrafluoroethylene, units (B) based on ethylene and units (C) based on $CH_2=CH-C_nF_{2n+1}$ (wherein n is an integer of from 2 to 10), wherein the molar ratio ((A)/(B)) of the above units (A) to the above units (B) is from 50/50 to 66/34, and the molar ratio ((C)/{(A)+(B)}) of the above units (C) to the sum of the above units (A) and the above units (B) is from 4.0/100 to 10/100.

20 Claims, No Drawings

OPTICAL MEMBER, PROCESS FOR PRODUCING SAME, AND ARTICLE PROVIDED WITH OPTICAL MEMBER

TECHNICAL FIELD

The present invention relates to an optical member, a process for producing the same, and an article provided with the optical member.

BACKGROUND ART

An electronic component, an electronic equipment, etc. are provided with an optical member (such as an optical film, an optical lens or a sealing material of a light emitting diode) in some cases.

As the optical member, it is required to use a resin material in some cases, for the following reason (i):

(i) Along with e.g. downsizing, higher integration and higher performance of e.g. an electronic component or an electronic equipment, an optical member is also required to be downsized. As a material for the optical member, a resin material is suitable with a view to readily processing the optical member into a small size.

Further, the optical member is required to have the heat resistance and the light resistance in some cases, for the following reasons (ii) and (iii):

(ii) An optical member is mounted on a circuit board by a solder reflow method in some cases. In the solder reflow method, it is desired to use a lead-free solder in order to cope with environmental problems. Accordingly, an optical member is required to have the heat resistance as to maintain a shape without being melted even at a reflow temperature (about 260° C.) of a lead-free solder.

(iii) Along with a tendency to high brightness of a light-emitting diode, a sealing material is required to have higher heat resistance and light resistance.

As a resin material excellent in the heat resistance and the light resistance, an ethylene/tetrafluoroethylene copolymer (hereinafter, referred to as ETFE) is known. However, a usual ETFE is not suitable for a resin material for optical members since the transparency is low due to high crystallinity.

As an ETFE having improved transparency, the following ETFE has been proposed.

ETFE comprising units (A) based on tetrafluoroethylene (hereinafter, referred to as TFE), units (B) based on ethylene (hereinafter, referred to as E) and units (C) based on $CH_2=CHC_nF_{2n+1}$ (wherein n is an integer of from 2 to 10), wherein the molar ratio ((A)/(B)) of the above units (A) to the above units (B) is from 50/50 to 60/40, and the content of the units (C) is from 2 to 7 mol % (Patent Document 1).

PRIOR ART DOCUMENT

Patent Document

Patent Document 1: Japanese Patent No. 3,424,270

DISCLOSURE OF INVENTION

Technical Problem

It is desired that a resin material for optical members has transparency as high as possible. Therefore, ETFE having transparency higher than the ETFE disclosed in Patent Document 1 is required.

The present invention provides an optical member having an excellent transparency and heat resistance and further having good light resistance, as compared with a molded product made of a conventional ETFE, a process for producing the same, and an article provided with the optical member.

Solution to Problem

The optical member of the present invention is made of a molded product containing a crosslinked product of the following EFTE:

(ETFE)

ETFE comprising units (A) based on TFE, units (B) based on E and units (C) based on $CH_2=CHC_nF_{2n+1}$ (wherein n is an integer of from 2 to 10), wherein the molar ratio ((A)/(B)) of the above units (A) to the above units (B) is from 50/50 to 66/34, the molar ratio ((C)/{(A)+(B)}) of the above units (C) to the sum of the above units (A) and the above units (B) is from 4.0/100 to 10/100.

The above ((C)/{(A)+(B)}) is preferably from 4.0/100 to 7.5/100.

The light transmittance at a wavelength of 400 nm of the optical member of the present invention is preferably at least 90.0% when the optical member has a thickness of 220 μm.

The shrinkage at the time of heating the optical member of the present invention at 280° C. for 5 minutes, is preferably within 5% in each of the vertical direction and the horizontal direction when the optical member has a thickness of 500 μm.

The process for producing the optical member of the present invention is a process for producing the optical member of the present invention, comprising irradiating a molded product of a resin material containing the ETFE with radiation and crosslinking the ETFE.

In the process for producing the optical member of the present invention, the radiation is preferably in a dosage of from 1 to 10 Mrad.

In the process for producing the optical member of the present invention, the radiation is preferably an electron beam.

The article of the present invention is provided with the optical member of the present invention.

Advantageous Effect of Invention

The optical member of the present invention has an excellent transparency and heat resistance and further has a favorable light resistance as compared with a molded product made of a conventional ETFE.

According to the process for producing the optical member of the present invention, it is possible to produce an optical member having improved transparency and further having excellent heat resistance and light resistance, as compared with a conventional ETFE.

The article of the present invention is one provided with the optical member having improved transparency and further having excellent heat resistance and light resistance, as compared with a conventional ETFE.

DESCRIPTION OF EMBODIMENTS

In this specification, "units" mean repeating units derived from a monomer, formed by polymerization of the monomer. The units may be units directly formed by the polymerization or may be units having part of the units converted to another structure by treating the polymer.

Further, in this specification, "monomer" means a compound having a polymerizable unsaturated group.

Further, in this specification, "(meth)acrylate" means an acrylate and a methacrylate.

Further, in the present invention, "radiation" means ionizing radiation such as γ-rays, electron beam or X-rays.

<Optical Member>

The optical member of the present invention is made of a molded product containing a crosslinked product of a specific ETFE. The crosslinked product of the ETFE is produced by irradiating the ETFE with radiation and thereby crosslinking the ETFE.

(ETFE)

The ETFE in the present invention comprises units (A) based on TFE, units (B) based on E and units (C) based on $CH_2=CHC_nF_{2n+1}$ (wherein n is an integer of from 2 to 10).

The molar ratio ((A)/(B)) of the units (A) to the units (B) is from 50/50 to 66/34, preferably from 53/47 to 65/35, more preferably from 56/44 to 60/40. When the molar ratio (A)/(B) is within such a range, balance of e.g. transparency, heat resistance light resistance, weather resistance, chemical resistance, gas barrier properties, fuel barrier properties, mechanical strength or moldability will be good.

The molar ratio ((C)/{(A)+(B)}) of the units (C) to the sum of the units (A) and the units (B) is from 4.0/100 to 10/100, preferably from 4.0/100 to 7.5/100, more preferably from 4.5/100 to 7.5/100, furthermore preferably from 4.6/100 to 7.5/100. When the (C)/{(A)+(B)} is at least 4.0/100, the transparency will be high. When the (C)/{(A)+(B)} is at most 10/100, ETFE will be easily produced.

n in $CH_2=CHC_nF_{2n+1}$ is an integer of from 2 to 10, preferably from 2 to 8, more preferably from 2 to 6. When n is at least 2, the resulting ETFE has excellent physical properties such as stress crack resistance. When n is at most 10, manufacturing of $CH_2=CHC_nF_{2n+1}$ is easy, and the polymerizability is excellent.

As a specific example of $CH_2=CHC_nF_{2n+1}$, $CH_2=CH(CF_2)_2F$, $CH_2=CH(CF_2)_3F$, $CH_2=CH(CF_2)_4F$, $CH_2=CH(CF_2)_5F$, $CH_2=CH(CF_2)_6F$, $CH_2=CH(CF_2)_7F$, $CH_2=CH(CF_2)_8F$, $CH_2=CH(CF_2)_9F$ or $CH_2=CH(CF_2)_{10}F$ may, for example, be mentioned.

$CH_2=CHC_nF_{2n+1}$ is preferably $CH_2=CH(CF_2)_2F$, $CH_2=CH(CF_2)_3F$, $CH_2=CH(CF_2)_4F$, $CH_2=CH(CF_2)_5F$, $CH_2=CH(CF_2)_6F$ or $CH_2=CH(CF_2)_7F$ or $CH_2=CH(CF_2)_8F$, more preferably $CH_2=CH(CF_2)_2F$, $CH_2=CH(CF_2)_3F$, $CH_2=CH(CF_2)_4F$, $CH_2=CH(CF_2)_5F$ or $CH_2=CH(CF_2)_6F$, since the polymerizability is excellent and an obtainable ETFE has excellent physical properties.

$CH_2=CHC_nF_{2n+1}$ may be used alone, or two or more of them may be used in combination.

The ETFE in the present invention may have units (D) based on other monomers other than the units (A), the units (B) and the units (C).

Such other monomers may, for example, be a hydrocarbon type olefin (such as propylene or butene), a fluoroolefin (such as vinylidene fluoride, vinyl fluoride or trifluoroethylene) having a hydrogen atom in an unsaturated group, a fluoroolefin (such as hexafluoropropylene or chlorotrifluoroethylene, provided that TFE is excluded) having no hydrogen atom in an unsaturated group, a perfluoro(alkyl vinyl ether) (such as perfluoro(propyl vinyl ether)), a vinyl ether (such as an alkyl vinyl ether, a (fluoroalkyl)vinyl ether, glycidyl vinyl ether, hydroxybutyl vinyl ether or methylvinyloxy butylcarbonate), a vinyl ester (such as vinyl acetate, vinyl chloroacetate, vinyl butanoate, vinyl pivalate, vinyl benzoate or vinyl crotonate), a (meth)acrylate (such as a (polyfluoroalkyl) acrylate or a (polyfluoroalkyl) methacrylate), or an acid anhydride (such as maleic anhydride, itaconic anhydride, citraconic anhydride or 5-norbornane-2,3-dicarboxylic acid anhydride).

Such other monomers may be used alone, or two or more of them may be used in combination.

In a case where the ETFE in the present invention has the units (D), the proportion of the units (D) is preferably from 0.01 to 20 mol %, more preferably from 0.01 to 10 mol %, furthermore preferably from 0.05 to 5 mol %, particularly preferably from 0.1 to 3 mol %, based on the total units (100 mol %) in the ETFE.

The ETFE in the present invention is preferably an ETFE comprising only the units (A), the units (B) and the units (C) from the viewpoint of excellent physical properties such as heat resistance and being easy to manufacturing.

The volume flow rate (hereinafter referred to as value Q) of the ETFE in the present invention is preferably from 1 to 1,000 mm³/sec, more preferably from 5 to 500 mm³/sec, furthermore preferably from 5 to 200 mm³/sec. The value Q is an index which represents the melt flowability of an ETFE and is used as an index for a molecular weight. The molecular weight is low when the value Q is high, and the molecular weight is high when the value Q is low. The value Q of an ETFE in the present invention is an extrusion rate of an ETFE at the time when it is extruded in an orifice having a diameter of 2.1 mm and a length of 8 mm under a load of 7 kg at a temperature of 297° C. by using a flow tester manufactured by Shimadzu Corporation.

(Process for Producing ETFE)

The ETFE may, for example, be produced by the process disclosed in JPA-2004-238405. The process for producing the ETFE is not limited to this process.

In the process for producing the ETFE, a polymerization method using a usual radical polymerization initiator may be employed. The polymerization method may be bulk polymerization, solution polymerization using an organic solvent (such as fluorohydrocarbon, chlorohydrocarbon, fluorochlorohydrocarbon, alcohol or hydrocarbon), suspension polymerization using an aqueous medium and, as the case requires, a proper organic solvent, and emulsion polymerization using an aqueous medium and an emulsifier. Among them, solution polymerization or suspension polymerization is preferred since no impurities such as an emulsifier remains in the ETFE.

The radical polymerization initiator is preferably an initiator of which the temperature at which the half-life is 10 hours, is 0 to 100° C., more preferably from 20 to 90° C.

As a specific example of the radical polymerization initiator, an azo compound (such as azobisisobutyronitrile), a non-fluorine type diacyl peroxide (such as diisobutyryl peroxide, dioctanoyl peroxide, dibenzoyl peroxide or dilauroyl peroxide), a peroxydicarbonate (such as diisopropyl peroxydicarbonate), a peroxyester (such as tert-butyl peroxypivalate, tert-butyl peroxyisobutyrate or tert-butyl peroxyacetate), a fluorinated diacyl peroxide (such as $(Z(CF_2)_pCOO)_2$ (wherein Z is a hydrogen atom, a fluorine atom or a chlorine atom, and p is an integer of from 1 to 10)), an inorganic peroxide (such as potassium persulfate, sodium persulfate or ammonium persulfate), may be mentioned.

In the solution polymerization, it is preferred to use a chain transfer agent in order to control a volume flow rate of the ETFE. The chain transfer agent may, for example, be an alcohol (such as methanol or ethanol), a chlorofluorohydrocarbon (such as 1,3-dichloro-1,1,2,2,3-pentafluoropropane, 3,3-dichloro-1,1,1,2,2-pentafluoropropane or 1,1-dichloro-1-fluoroethane), or a hydrocarbon (such as pentane, hexane, cyclopentane or cyclohexane). Further, in order to introduce a functional group excellent in adhesion with a substrate (such as polyamide) to the terminals of the ETFE, a chain transfer agent having a functional group (such as an ester group, a carbonate group, a hydroxy group, a carboxyl group or a carbonyl fluoride group) may be used. Such a chain transfer agent may, for example, be acetic acid, methyl acetate, ethylene glycol or propylene glycol.

The polymerization temperature is preferably from 0 to 100° C., more preferably from 20 to 90° C.

The polymerization pressure is preferably from 0.1 to 10 MPa, more preferably from 0.5 to 3 MPa.

The polymerization time is preferably from 1 to 30 hours, more preferably from 2 to 20 hours, further more preferably from 2 to 10 hours. Further, it is confirmed that a radical polymerization initiator remaining in the ETFE tends to foam at the time of heat molding if too much radical polymerization initiator is added, and therefore it is necessary to adjust the polymerization time within a range that the radical polymerization initiator will not foam.

(Other Components)

The optical member of the present invention may contain a heat stabilizer from the viewpoint of excellent heat stability. The heat stabilizer is preferably at least one member selected from the group consisting of a copper compound, a tin compound, an iron compound, a lead compound, a titanium compound and an aluminum compound. As a specific example, copper oxide, copper iodide, alumina, tin sulfate, germanium sulfate, basic lead sulfate, tin sulfite, barium phosphate or tin pyrophosphate may, for example, be mentioned, and copper oxide or copper iodide is preferred. The content of the heat stabilizer is preferably from $1 \times 10^{-8}$ to 5 mass %, more preferably from $1 \times 10^{-7}$ to 2 mass %, furthermore preferably from $5 \times 10^{-7}$ to 1 mass % in an optical member.

The optical member of the present invention may also contain other compounding agents depending on the particular application and purpose. Such other compounding agents may, for example, be a variety of additives, fillers and other synthetic resins. The total content of the heat stabilizer and such other compounding agents is preferably at most 80 mass %, more preferably at most 50 mass %, furthermore preferably at most 20 mass %.

(Transparency)

Of the optical member of the present invention, the light transmittance at a wavelength of 400 nm is preferably at least 90.0%, more preferably at least 90.5%, furthermore preferably at least 90.9% when the optical member has a thickness of 220 μm.

The light transmittance is measured as follows.

A resin material containing the ETFE is press-molded in a range of a melting point +50° C.±20° C. (e.g. a range of from 280° C. to 320° C. when a melting point is 250° C.) to obtain an ETFE film having a thickness of 220 μm. The ETFE film is irradiated with a radiation to obtain a sample. Regarding the sample, the light transmittance at a wavelength of 400 nm is measured by using a spectrophotometer.

(Heat Resistance)

Of the optical member of the present invention, the shrinkage at the time of heating at 280° C. for 5 minutes is preferably within 5%, more preferably within 3%, furthermore preferably within 2% in each of the vertical direction and the horizontal direction.

The shrinkage is measured in such a manner that the ETFE is press-molded to prepare a 500 μm-thick film, and then the film is cut out into 50 mm×50 mm, followed by heating at 280° C. for 5 minutes, and the measurement is carried out.

(Light Resistance)

Usually, the transparency after irradiation for 100 hours at a black panel temperature of 63° C., using Sunshine Weather Meter (Suga Test Instruments Co., Ltd.), is evaluated, whereby no change in the transparency is conformed.

(Process For Producing Optical Member)

The optical member of the present invention is produced by irradiating a molded product of a resin material containing a specific ETFE with a radiation and crosslinking the ETFE.

The resin material may contain the above heat stabilizer or other compounding agents, other than the ETFE.

The molded product is obtained by molding the resin material. A molding method may be a known molding method (such as extrusion, injection molding or press molding).

Crosslinking conditions of the ETFE are properly set depending on e.g. a shape or a thickness of the molded product.

The optical member can be obtained by irradiating the above molded product with ionizing radiation such as γ-rays, electron beam or X-rays. The crosslinking conditions are determined depending on a shape or a thickness of the molded product, but basically, a radiation is preferably electron beam from the viewpoint of equipment.

The irradiation with electron beam is carried out at least once or more in a temperature atmosphere of less than the melting point of a fluororesin, preferably in a temperature atmosphere of at most a glass transition point, and at least once in a temperature atmosphere of at least a melting point of the fluororesin. When the crosslinking is carried out by irradiation with electron beam in the temperature atmosphere of less than the melting point of the fluororesin, neither melting nor deformation is observed even when a molded product is heated to at least a melting point of the fluororesin when the second irradiation is carried out, whereby the shape of the molded product is maintained. Thus, a crosslinked product indicates one having a melt molding property lost with a value Q of a fluororesin of 0 mm³/sec.

The radiation is in a dosage of usually from 1 to 20 Mrad, preferably from 3 to 10 Mrad.

(Advantageous Effect)

As described above, the optical member of the present invention is made of a molded product containing a crosslinked product of an ETFE comprising the units (C) based on $CH_2=CHC_nF_{2n+1}$ (wherein n is an integer of from 2 to 10) in a specific proportion, whereby the transparency thereof is excellent as compared with a non-crosslinked molded product made of a conventional ETFE. It has heretofore been known that the transparency of a molded product is improved by increasing the proportion of the units (C) in an ETFE, but in the present invention, the transparency of a molded product is more improved by irradiating an ETFE having a relatively high proportion of the units (C) with a radiation and thereby crosslinking the ETFE.

Further, as described above, the optical member of the present invention is made of a molded product containing a crosslinked product of an ETFE, whereby the heat resistance thereof is excellent as compared with a non-crosslinked molded product made of a conventional ETFE.

Moreover, as described above, in the optical member of the present invention, an ETFE originally having good light resistance is used, and therefore the light resistance is good.

The optical member of the present invention has a high transparency applicable to an optical member while maintaining properties such as light resistance, weather resistance, chemical resistance and gas barrier properties of a conventional ETFE.

Further, the optical member of the present invention has a high heat resistance applicable to solder reflow using a lead-free solder.

\<Article Provided With Optical Member\>

The article of the present invention is one provided with the optical member of the present invention.

The article of the present invention may, for example, be an electronic device (such as a mobile phone, a notebook computer, a digital camera or a liquid crystal TV) having the optical member of the present invention mounted as an optical film (such as a light guide plate, a light diffusion sheet or a light condensing sheet), or an optical lens (such as a pickup lens, a camera lens, a microarray lens, a projector lens or a Fresnel lens), or a light-emitting diode provided with the optical member of the present invention as a sealing material.

EXAMPLES

Now, the present invention will be described in detail with reference to Examples but it should be understood that the present invention is by no means restricted thereto.

Examples 1 to 7 are Examples of the present invention, and Examples 8 to 13 are Comparative Examples.

(Proportion of Respective Units)

The proportions of the respective units in the ETFE were calculated from results of total fluorine content measurement and melt $^{19}$F-NMR measurement.

(Melting Point)

By means of a scanning differential calorimeter (EXSTAR DSC7020, manufactured by Seiko Instruments Inc.), the melting point of the ETFE was obtained from the endothermic peak at the time of heating the ETFE at a rate of 10° C./min.

(Value Q)

The value Q is an extrusion rate (mm$^3$/sec) of the ETFE at the time when it is extruded in an orifice having a diameter of 2.1 mm and a length of 8 mm under a load of 7 kg at a temperature of 297° C. by means of a flow tester manufactured by Shimadzu Corporation.

(Light Transmittance Before Crosslinking ETFE)

The ETFE was press-molded in a range of a melting point+ 50° C.±20° C. to obtain a 220-μm thick ETFE film. Of the ETFE film, the light transmittance at a wavelength of 400 nm was measured by means of UV-3600, manufactured by Shimadzu Corporation.

(Light Transmittance After Crosslinking ETFE)

The ETFE was press-molded in a range of a melting point+ 50° C.±20° C. to obtain a 220-μm thick ETFE film. The ETFE film was irradiated with a radiation to obtain a sample. The light transmittance at a wavelength of 400 nm of the sample, was measured by means of UV-3600 manufactured by Shimadzu Corporation.

(Heat Resistance)

The shrinkage was measured in such a manner that a 500 μm-thick film prepared by press molding was cut out into 50 mm×50 mm, followed by heating at 280° C. for 5 minutes to carry out the measurement. ○ (Good) represents a case where the shrinkage is within 5% in each of the vertical direction and the horizontal direction, and X (poor) represents a case where the shrinkage exceeds 5% in either or both of the vertical direction and the horizontal direction.

Example 1

Into a 94 L stainless steel autoclave vacuum-deaerated, 87.3 kg of 1-hydrotridecafluorohexane, 4.21 kg of 1,3-dichloro-1,1,2,2,3-pentafluoropropane (AK225cb, manufactured by Asahi Glass Company, Limited, hereinafter referred to as AK225cb) and 2.13 kg of $CH_2=CH(CF_2)_4F$ were charged, the autoclave was heated to 66° C. with stirring, a mixed gas of TFE/E=89/11 (molar ratio) was charged until the pressure became 1.5 MPaG, and then 60.4 g of an AK225cb solution containing 50 mass % of tert-butylperoxypivalate was charged to initiate polymerization. During the polymerization, a mixed gas of TFE/E=60/40 (molar ratio) and $CH_2=CH(CF_2)_4F$ in an amount corresponding to 7.0 mol % to the mixed gas were continuously added so that the pressure was 1.5 MPaG, and after 7.19 kg of the TFE/E mixed gas was charged, the autoclave was cooled to purge a remaining gas, and the polymerization was completed. A time required for the polymerization was 333 minutes.

The obtained slurry ETFE was transferred to a 220 L granulation tank, 77 L of water was added and heated with stirring, and the polymerization solvent and the remaining monomer were removed to obtain 7.2 kg of ETFE 1. The ratio of the respective units in ETFE 1 was such that units (A)/units (B)/units (C)=54.5/39.0.16.5 (molar ratio). (A)/(B), (C)/{(A)+(B)}, a melting point and a value Q are shown in Table 1.

ETFE 1 was press-molded at 250° C. to obtain a 220 μm-thick ETFE film. The ETFE film was irradiated with a radiation (electron beam) in a dosage of 5 Mrad thereby to obtain a sample. The light transmittance at a wavelength of 400 nm of the sample is shown in Table 1. Further, the heat resistance at 280° C. of the sample was evaluated, and no deformation was observed. The light resistance was not also problematic.

Example 2

A polymerization reactor equipped with a stirrer having an internal capacity of 1.3 L was deaerated, and 1,198.2 g of 1-hydrotridecafluorohexane, 104.2 g of AK225cb and 32.8 g of $CH_2=CH(CF_2)_4F$ were charged; 182.7 g of TFE and 6.3 g of E were injected; the interior of the polymerization reactor was heated to 66° C.; and 15.4 mL of a 1-hydrotridecafluorohexane solution containing 2.5 mass % of tert-butylperoxypivalate was charged as the radical polymerization initiator to initiate polymerization. During the polymerization, a mixed gas of TFE/E=60/40 (molar ratio) was continuously charged, so that the pressure was kept constant, and $CH_2=CH(CF_2)_4F$ was continuously charged so as to be 5.0 mol % to the mixed gas. After 239 minutes from the initiation of the polymerization, and at the time when 100 g of the mixed gas was charged, the internal temperature of the polymerization reactor was decreased to room temperature and at the same time, purging was carried out until the pressure reached normal pressure.

The obtained slurry ETFE was subjected to suction filtration with a glass filter, and was dried at 150° C. for 15 hours to obtain 107 g of ETFE 2. The ratio of the respective units in ETFE 2 was such that units (A)/units (B)/units (C)=53.0/ 41.4/5.6 (molar ratio). (A)/(B), (C)/{(A)+(B)}, a melting point and a value Q are shown in Table 1.

ETFE 2 was press-molded at 270° C. to obtain a 220 μm-thick ETFE film. The ETFE film was irradiated with a radiation (electron beam) in a dosage of 5 Mrad thereby to obtain a sample. The light transmittance at a wavelength of 400 nm of the sample is shown in Table 1. Further, the heat resistance at 280° C. of the sample was evaluated, and no deformation was observed. The light resistance was not also problematic.

Example 3

A polymerization reactor equipped with a stirrer having an internal capacity of 1.3 L was deaerated, and 1,156.5 g of 1-hydrotridecafluorohexane, 142.9 g of AK225cb and 22.7 g of $CH_2=CH(CF_2)_4F$ were charged; 187.6 g of TFE and 6.5 g of E were injected; the interior of the polymerization reactor was heated to 66° C.; and 10.6 mL of a 1-hydrotridecafluorohexane solution containing 2.5 mass % of tert-butylperoxypivalate was charged as the radical polymerization initiator to initiate polymerization. During the polymerization, a mixed gas of TFE/E=60/40 (molar ratio) was continuously charged, so that the pressure was kept constant, and $CH_2=CH(CF_2)4F$ was continuously charged. After 196 minutes from the initiation of the polymerization, and at the time when 100 g of the mixed gas was charged, the internal temperature of the polymerization reactor was decreased to room temperature, and at the same time, purging was carried out until the pressure reached normal pressure.

The obtained slurry ETFE was subjected to suction filtration with a glass filter, and was dried at 150° C. for 15 hours to obtain 96 g of ETFE 3. The ratio of the respective units in ETFE 3 was such that units (A)/units (B)/units (C)=54.3/41.3/4.4 (molar ratio). (A)/(B), (C)/{(A)+(B)}, a melting point and a value Q are shown in Table 1.

ETFE 3 was press-molded at 270° C. to obtain a 220 μm-thick ETFE film. The ETFE film was irradiated with a radiation (electron beam) in a dosage of 5 Mrad thereby to obtain a sample. The light transmittance at a wavelength of 400 nm of the sample is shown in Table 1. Further, the heat resistance at 280° C. of the sample was evaluated, and no deformation was observed. The light resistance was not also problematic.

Example 4

A polymerization reactor equipped with a stirrer having an internal capacity of 1.3 L was deaerated, and 1,179.4 g of 1-hydrotridecafluorohexane, 167.4 g of AK225cb and 15.5 g of $CH_2=CH(CF_2)_2F$ were charged; 187.6 g of TFE and 6.5 g of E were injected, the interior of the polymerization reactor was heated to 66° C.; and 10.6 mL of a 1-hydrotridecafluorohexane solution containing 2.5 mass % of tert-butylperoxypivalate was charged as the radical polymerization initiator to initiate the polymerization. During the polymerization, a mixed gas of TFE/E=60/40 (molar ratio) was continuously charged, so that the pressure was kept constant, and $CH_2=CH(CF_2)_2F$ was continuously charged so as to be 4.0 mol % to the mixed gas. After 200 minutes from the initiation of the polymerization, and at the time when 100 g of the mixed gas was charged, the internal temperature of the polymerization reactor was decreased to room temperature, and at the same time, purging was carried out until the pressure reached normal pressure.

The obtained slurry ETFE was subjected to suction filtration with a glass filter, and was dried at 150° C. for 15 hours to obtain 98 g of ETFE 4. The ratio of the respective units in ETFE 4 was such that units (A)/units (B)/units (C)=54.2/41.3/4.5 (molar ratio). (A)/(B), (C)/{(A)+(B)}, a melting point and a value Q are shown in Table 1.

ETFE 4 was press-molded at 270° C. to obtain a 220 μm-thick ETFE film. The ETFE film was irradiated with a radiation (electron beam) in a dosage of 5 Mrad thereby to obtain a sample. The light transmittance at a wavelength of 400 nm of the sample is shown in Table 1. Further, the heat resistance at 280° C. of the sample was evaluated, and no deformation was observed. The light resistance was not also problematic.

Example 5

A polymerization reactor equipped with a stirrer having an internal capacity of 1.3 L was deaerated, and 1,194.5 g of 1-hydrotridecafluorohexane, 153.4 g of AK225cb and 33.0 g of $CH_2=CH(CF_2)_6F$ were charged; 187.6 g of TFE and 6.5 g of E were injected, the interior of the polymerization reactor was heated to 66° C.; and 10.6 mL of a 1-hydrotridecafluorohexane solution containing 2.5 mass % of tert-butylperoxypivalate was charged as the radical polymerization initiator to initiate the polymerization. During the polymerization, a mixed gas of TFE/E=60/40 (molar ratio) was continuously charged, so that the pressure was kept constant, and $CH_2=CH(CF_2)_6F$ was continuously charged so as to be 4.0 mol % to the mixed gas. After 193 minutes from the initiation of the polymerization, and at the time when 100 g of the mixed gas was charged, the internal temperature of the polymerization reactor was decreased to room temperature, and at the same time, purging was carried out until the pressure reached normal pressure.

The obtained slurry ETFE was subjected to suction filtration with a glass filter, and was dried at 150° C. for 15 hours to obtain 99 g of ETFE 5. The ratio of the respective units in ETFE 5 was such that units (A)/units (B)/units (C)=54.4141.3/4.3 (molar ratio). (A)/(B), (C)/{(A)+(B)}, a melting point and a value Q are shown in Table 1.

ETFE 5 was press-molded at 270° C. to obtain a 220 μm-thick ETFE film. The ETFE film was irradiated with a radiation (electron beam) in a dosage of 5 Mrad thereby to obtain a sample. The light transmittance at a wavelength of 400 nm of the sample is shown in Table 1. Further, the heat resistance at 280° C. of the sample was evaluated, and no deformation was observed. The light resistance was not also problematic.

Example 6

A polymerization reactor equipped with a stirrer having an internal capacity of 1.3 L was deaerated, and 1,128.8 g of 1-hydrotridecafluorohexane, 168.7 g of AK225cb and 20.2 g of $CH_2=CH(CF_2)_4F$ were charged; 187.6 g of TFE and 6.5 g of E were injected; the interior of the polymerization reactor was heated to 66° C.; and 10.6 mL of a 1-hydrotridecafluorohexane solution containing 2.5 mass % of tert-butylperoxypivalate was charged as the radical polymerization initiator to initiate the polymerization. During the polymerization, a mixed gas of TFE/E=60/40 (molar ratio) was continuously charged, so that the pressure was kept constant, and $CH_2=CH(CF_2)_4F$ was continuously charged so as to be 4.0 mol % to the mixed gas. After 175 minutes from the initiation of the polymerization, and at the time when 100 g of the mixed gas was charged, the internal temperature of the polymerization reactor was decreased to room temperature, and at the same time, purging was carried out until the pressure reached normal pressure.

The obtained slurry ETFE was subjected to suction filtration with a glass filter, and was dried at 150° C. for 15 hours to obtain 98 g of ETFE 6. The ratio of the respective units in ETFE 6 was such that units (A)/units (B)/units (C)=56.4/39.6/4.0 (molar ratio). (A)/(B), (C)/{(A)+(B)}, a melting point and a value Q are shown in Table 1.

ETFE 6 was press-molded at 270° C. to obtain a 220 μm-thick ETFE film. The ETFE film was irradiated with a radiation (electron beam) in a dosage of 5 Mrad thereby to obtain a sample. The light transmittance at a wavelength of 400 nm of the sample is shown in Table 1. Further, the heat resistance at 280° C. of the sample was evaluated, and no deformation was observed. The light resistance was not also problematic.

Example 7

A polymerization reactor equipped with a stirrer having an internal capacity of 1.3 L was deaerated, and 1,217.0 g of 1-hydrotridecafluorohexane, 12.3 g of methanol and 24.5 g of $CH_2=CH(CF_2)_4F$ were charged; 209.1 g of TFE and 7.4 g of E were injected; the interior of the polymerization reactor was heated to 35° C.; and 30.8 mL of a 1-hydrotridecafluorohexane solution containing 30 mass % of diisopropylperoxydicarbonate was charged as the radical polymerization initiator to initiate the polymerization. During the polymerization, a mixed gas of TFE/E=60/40 (molar ratio) was continuously charged, so that the pressure was kept constant, and $CH_2=CH(CF_2)_4F$ was continuously charged so as to be 4.0 mol % to the mixed gas. After 187 minutes from the initiation of the polymerization, and at the time when 100 g of the mixed gas was charged, the internal temperature of the polymerization reactor was decreased to room temperature, and at the same time, purging was carried out until the pressure reached normal pressure.

The obtained slurry ETFE was subjected to suction filtration with a glass filter, and was dried at 150° C. for 15 hours to obtain 93.8 g of ETFE 7. The proportion of the respective units in ETFE 7 was such that units (A)/units (B)/units (C)=54.3/41.6/4.1 (molar ratio). (A)/(B), (C)/{(A)+(B)}, a melting point and a value Q are shown in Table 1.

ETFE 7 was press-molded at 270° C. to obtain a 220 µm-thick ETFE film. The ETFE film was irradiated with a radiation (electron beam) in a dosage of 5 Mrad thereby to obtain a sample. The light transmittance at a wavelength of 400 nm of the sample is shown in Table 1. Further, the heat resistance at 280° C. of the sample was evaluated, and no deformation was observed. The light resistance was not also problematic.

Example 8

The light transmittance of the non-crosslinked ETFE film in Example 1 is shown in Table 2. Further, the heat resistance at 280° C. of the film was evaluated, and it was found to be melted.

Example 9

The light transmittance of the non-crosslinked ETFE film in Example 4 is shown in Table 2. Further, the heat resistance at 280° C. of the film was evaluated, and it was found to be melted.

Example 10

The light transmittance of the non-crosslinked ETFE film in Example 5 is shown in Table 2. Further, the heat resistance at 280° C. of the film was evaluated, and it was found to be melted.

Example 11

The light transmittance of the non-crosslinked ETFE film in Example 7 is shown in Table 2. Further, the heat resistance at 280° C. of the film was evaluated, and it was found to be melted.

Example 12

A polymerization reactor equipped with a stirrer having an internal capacity of 1.3 L was deaerated, and 1,274.3 g of 1-hydrotridecafluorohexane, 23.4 g of methanol and 8.1 g of $CH_2=CH(CF_2)_4F$ were charged; 183.5 g of TFE and 11.0 g of E were injected; the interior of the polymerization reactor was heated to 35° C.; and 15.4 mL of a 1-hydrotridecafluorohexane solution containing 15 mass % of diisopropylperoxydicarbonate was charged as the radical polymerization initiator to initiate the polymerization. During the polymerization, a mixed gas of TFE/E=54/46 (molar ratio) was continuously charged, so that the pressure was kept constant, and $CH_2=CH(CF_2)_4F$ was continuously charged so as to be 1.4 mol % to the mixed gas. After 300 minutes from the initiation of the polymerization, and at the time when 90 g of the mixed gas was charged, the internal temperature of the polymerization reactor was decreased to room temperature, and at the same time, purging was carried out until the pressure reached normal pressure.

The obtained slurry ETFE was subjected to suction filtration with a glass filter, and was dried at 150° C. for 15 hours to obtain 95.8 g of ETFE 8. The ratio of the respective units in ETFE 8 was such that units (A)/units (B)/units (C)=52.2/46.3/1.5 (molar ratio). (A)/(B), (C)/{(A)+(B)}, a melting point and a value Q are shown in Table 2.

ETFE 8 was press-molded at 310° C. to obtain a 220 µm-thick ETFE film. The light transmittance of the film is shown in Table 2. Further, the heat resistance at 280° C. of the film was evaluated, and it was found to be melted.

Example 13

The ETFE film in Example 12 was irradiated with a radiation (electron beam) in a dosage of 5 Mrad thereby to obtain a sample. The light transmittance at a wavelength of 400 nm of the sample is shown in Table 2. Further, the heat resistance at 280° C. of the sample was evaluated, and no deformation was observed.

TABLE 1

|  | Ex. 1 | Ex. 2 | Ex. 3 | Ex. 4 | Ex. 5 | Ex. 6 | Ex. 7 |
| --- | --- | --- | --- | --- | --- | --- | --- |
| Number of n in units (C) | 4 | 4 | 4 | 2 | 6 | 4 | 4 |
| (A)/(B) | 58.3/41.7 | 56.2/43.8 | 56.8/43.2 | 56.8/43.2 | 56.8/43.2 | 58.8/41.2 | 56.6/43.4 |
| (C)/{(A) + (B)} | 7.0/100 | 5.9/100 | 4.6/100 | 4.7/100 | 4.5/100 | 4.2/100 | 4.3/100 |
| Melting point (non-crosslinked) (° C.) | 195 | 221 | 222 | 221 | 220 | 220 | 219 |
| Value Q (non-crosslinked) (mm³/sec) | 19.3 | 51.4 | 11.4 | 12.0 | 11.6 | 21.4 | 24.8 |
| Crosslinked or not crosslinked | Crosslinked | Crosslinked | Crosslinked | Crosslinked | Crosslinked | Crosslinked | Crosslinked |
| Light transmittance (%) | 92.0 | 92.8 | 92.2 | 91.9 | 92.9 | 91.5 | 92.0 |
| Heat resistance | ○ | ○ | ○ | ○ | ○ | ○ | ○ |

TABLE 2

|  | Ex. 8 | Ex. 9 | Ex. 10 | Ex. 11 | Ex. 12 | Ex. 13 |
|---|---|---|---|---|---|---|
| Number of n in units (C) | 4 | 2 | 6 | 4 | 4 | 4 |
| (A)/(B) | 58.3/41.7 | 56.8/43.2 | 56.8/43.2 | 56.6/43.4 | 53.0/47.0 | 53.0/47.0 |
| (C)/{(A) + (B)} | 7.0/100 | 4.7/100 | 4.5/100 | 4.3/100 | 1.5/100 | 1.5/100 |
| Melting point (not crosslinked) (° C.) | 195 | 221 | 220 | 219 | 268 | 268 |
| Value Q (not crosslinked) (mm³/sec) | 19.3 | 12.0 | 11.6 | 24.8 | 18.6 | 18.6 |
| Crosslinked or not crosslinked | Not crosslinked | Not crosslinked | Not crosslinked | Not crosslinked | Not crosslinked | Crosslinked |
| Light transmittance (%) | 91.8 | 90.8 | 91.2 | 89.5 | 83.5 | 88.8 |
| Heat resistance | X | X | X | X | X | ○ |

INDUSTRIAL APPLICABILITY

The optical member of the present invention is suitably used for e.g. an optical film, an optical lens or a sealing material for a light-emitting diode, since it is excellent in the transparency. The optical member of the present invention is applicable to e.g. mounting on e.g. a circuit board by a solder reflow method using a lead-free solder, since it is excellent in the transparency and the heat resistance.

This application is a continuation of PCT Application No. PCT/JP2013/050983, filed on Jan. 18, 2013, which is based upon and claims the benefit of priority from Japanese Patent Application No. 2012-016477 filed on Jan. 30, 2012. The contents of those applications are incorporated herein by reference in their entireties.

What is claimed is:

1. An optical member, comprising:
   a molded product comprising a crosslinked product of an ethylene/tetrafluoroethylene copolymer,
   wherein the ethylene/tetrafluoroethylene copolymer includes
      units (A) based on tetrafluoroethylene,
      units (B) based on ethylene and
      units (C) based on $CH_2\!\!=\!\!CHC_nF_{2n+1}$
   where n is an integer of from 2 to 6,
   a molar ratio (A)/(B) of the units (A) to the units (B) is from 50/50 to 66/34, a molar ratio (C)/{(A)+(B)} of the units (C) to a sum of the units (A) and the units (B) is from 4.0/100 to 7.5/100, and the optical member has a light transmittance at a wavelength of 400 nm of at least 90.0% when the optical member has a thickness of 220 μm.

2. The optical member according to claim 1, wherein the molar ratio (C)/{(A)+(B)} is from 4.5/100 to 7.5/100.

3. The optical member according to claim 1, wherein the light transmittance at the wavelength of 400 nm is at least 92.0%.

4. The optical member according to claim 1, wherein the optical member has a shrinkage upon heated at 280° C. for 5 minutes, which is within 5% in each of a vertical direction and a horizontal direction when the optical member has a thickness of 500 μm.

5. A process for producing the optical member as defined in claim 1, comprising:
   irradiating a molded product of a resin material including the ethylene/tetrafluoroethylene copolymer with radiation such that the crosslinked product of the ethylene/tetrafluoroethylene copolymer is produced,
   wherein the radiation is an electron beam and irradiated in a dosage of from 1 to 10 Mrad.

6. The process according to claim 5, wherein the radiation is irradiated in a dosage of from 3 to 10 Mrad.

7. The process according to claim 5, wherein the radiation is irradiated in a dosage of 3 to 5 Mrad.

8. An article, comprising:
   the optical member as defined in claim 1.

9. The optical member according to claim 1, wherein the molar ratio (C)/{(A)+(B)} is from 4.6/100 to 7.5/100.

10. The optical member according to claim 3, wherein the molar ratio (A)/(B) of the units (A) to the units (B) is from 53/47 to 65/35, and the molar ratio (C)/{(A)+(B)} is from 4.6/100 to 7.5/100.

11. The optical member according to claim 1, wherein n is 2.

12. The optical member according to claim 1, wherein n is 4.

13. The optical member according to claim 10, wherein n is 2.

14. The optical member according to claim 10, wherein n is 4.

15. The optical member according to claim 10, wherein the ethylene/tetrafluoroethylene copolymer includes only the units (A), the units (B) and the units (C).

16. A process for producing the optical member as defined in claim 3, comprising:
   irradiating a molded product of a resin material including the ethylene/tetrafluoroethylene copolymer with radiation such that the crosslinked product of the ethylene/tetrafluoroethylene copolymer is produced,
   wherein the radiation is an electron beam and irradiated in a dosage of from 1 to 10 Mrad.

17. The process according to claim 16, wherein the radiation is irradiated in a dosage of 3 to 5 Mrad.

18. A process for producing the optical member as defined in claim 10, comprising:
   irradiating a molded product of a resin material including the ethylene/tetrafluoroethylene copolymer with radiation such that the crosslinked product of the ethylene/tetrafluoroethylene copolymer is produced,
   wherein the radiation is an electron beam and irradiated in a dosage of from 1 to 10 Mrad.

19. The process according to claim 18, wherein the radiation is irradiated in a dosage of 3 to 5 Mrad.

20. The process according to claim 18, wherein the radiation is irradiated in a dosage of 5 Mrad.

* * * * *